United States Patent
Takagi

(10) Patent No.: US 11,385,533 B2
(45) Date of Patent: Jul. 12, 2022

(54) WAVELENGTH CONVERTER, LIGHT SOURCE APPARATUS, AND PROJECTOR

(71) Applicant: SEIKO EPSON CORPORATION, Tokyo (JP)

(72) Inventor: Kunihiko Takagi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 16/896,537

(22) Filed: Jun. 9, 2020

(65) Prior Publication Data
US 2020/0387059 A1 Dec. 10, 2020

(30) Foreign Application Priority Data

Jun. 10, 2019 (JP) .............................. JP2019-107909

(51) Int. Cl.
| | |
|---|---|
| *G03B 21/20* | (2006.01) |
| *G03B 21/16* | (2006.01) |
| *F21V 29/76* | (2015.01) |
| *F21V 29/50* | (2015.01) |
| *F21K 9/64* | (2016.01) |
| *F21V 29/503* | (2015.01) |

(52) U.S. Cl.
CPC .............. *G03B 21/204* (2013.01); *F21K 9/64* (2016.08); *F21V 29/503* (2015.01); *F21V 29/763* (2015.01); *G03B 21/16* (2013.01)

(58) Field of Classification Search
None
See application file for complete search history.

(56) References Cited

U.S. PATENT DOCUMENTS

| | | | |
|---|---|---|---|
| 2016/0359134 A1 | 12/2016 | Park et al. | |
| 2019/0041732 A1 | 2/2019 | Takagi et al. | |
| 2020/0271303 A1* | 8/2020 | Wang | ........................ F21V 5/00 |

FOREIGN PATENT DOCUMENTS

| | | |
|---|---|---|
| JP | 2001284701 | 10/2001 |
| JP | 2013-069547 A | 4/2013 |
| JP | 2017-504500 A | 2/2017 |
| JP | 2018-022792 A | 2/2018 |
| JP | 2019-028386 A | 2/2019 |

* cited by examiner

*Primary Examiner* — Michelle M Iacoletti
*Assistant Examiner* — Danell L Owens
(74) *Attorney, Agent, or Firm* — Dority & Manning, P.A.

(57) ABSTRACT

A wavelength converter according to the present disclosure includes a wavelength conversion layer having a first surface on which excitation light that belongs to a first wavelength band is incident and a second surface different from the first surface and converts the excitation light into fluorescence that belongs to a second wavelength band different from the first wavelength band, and a base so provided as to face the second surface. The base includes a first heat dissipation section so provided as to face a light incident area of the first surface that is an area on which the excitation light is incident and a second heat dissipation section the thermal conductivity of which in a first direction that intersects the first surface is lower than the thermal conductivity of the first heat dissipation section.

17 Claims, 10 Drawing Sheets

WAVELENGTH CONVERTER, LIGHT SOURCE APPARATUS, AND PROJECTOR

The present application is based on, and claims priority from JP Application Serial Number 2019-107909, filed Jun. 10, 2019, the disclosure of which is hereby incorporated by reference herein in its entirety.

BACKGROUND

1. Technical Field

The present disclosure relates to a wavelength converter, a light source apparatus, and a projector.

2. Related Art

As a light source apparats used in a projector, there has been a proposed light source apparatus that uses fluorescence emitted from a phosphor irradiated with excitation light outputted from a light source. When the phosphor is irradiated with the excitation light, the temperature of the phosphor having absorbed the excitation light increases. On the other hand, there is a phenomenon called optical extinction that causes a decrease in light emission efficiency of a phosphor as the temperature of the phosphor increases so that the amount of emitted fluorescence decreases.

To suppress the optical extinction, there has been a proposed wavelength converter having improved heat dissipation performance resulting from an increase in thermal conductivity of a base that supports the phosphor. JP-A-2013-69547 discloses a heat dissipating substrate that supports a phosphor layer. The heat dissipating substrate is made of metal impregnated graphite and having one surface provided with a metal reflection layer and the other surface provided with an irregular structure for facilitating the heat dissipation.

In general, a graphite-base carbon material is known to have excellent thermal conductivity. Using the heat dissipating substrate made of metal impregnated graphite described in JP-A-2013-69547, however, still does not undesirably provide high heat dissipation performance, and it is difficult to suppress a decrease in the light emission efficiency.

SUMMARY

A wavelength converter according to an aspect of the present disclosure includes a wavelength conversion layer having a first surface on which excitation light that belongs to a first wavelength band is incident and a second surface different from the first surface and converts the excitation light into fluorescence that belongs to a second wavelength band different from the first wavelength band, and a base so provided as to face the second surface, and the base includes a first heat dissipation section so provided as to face a light incident area of the first surface that is an area on which the excitation light is incident and a second heat dissipation section thermal conductivity of which in a first direction that intersects the first surface is lower than thermal conductivity of the first heat dissipation section.

In the wavelength converter according to the aspect of the present disclosure, the first heat dissipation section may be so provided as to be in contact with the second heat dissipation section in a second direction that intersects the first direction, and the thermal conductivity of the first heat dissipation section in the second direction may be lower than the thermal conductivity of the second heat dissipation section in the second direction.

In the wavelength converter according to the aspect of the present disclosure, a dimension of the first heat dissipation section in the second direction may be smaller than a dimension of the wavelength conversion layer in the second direction when viewed along the first direction, and the dimension of the first heat dissipation section in the second direction may be smaller than a size of the light incident area in the second direction when viewed along the first direction.

In the wavelength converter according to the aspect of the present disclosure, a dimension of the first heat dissipation section in the second direction may be smaller than a dimension of the wavelength conversion layer in the second direction when viewed along the first direction, and the dimension of the first heat dissipation section in the second direction may be greater than a size of the light incident area in the second direction when viewed along the first direction.

In the wavelength converter according to the aspect of the present disclosure, a dimension of the first heat dissipation section in the second direction may be greater than a dimension of the wavelength conversion layer in the second direction when viewed along the first direction, and the dimension of the first heat dissipation section in the second direction may be greater than a size of the light incident area in the second direction when viewed along the first direction.

In the wavelength converter according to the aspect of the present disclosure, the second heat dissipation section may include a first heat dissipator and a second heat dissipator, the first heat dissipator and the second heat dissipator may be provided along the second direction, and the first heat dissipation section may be provided between the first heat dissipator and the second heat dissipator.

In the wavelength converter according to the aspect of the present disclosure, the thermal conductivity of the first heat dissipation section in a third direction that intersects the first and second directions may be higher than the thermal conductivity of the second heat dissipation section in the third direction.

In the wavelength converter according to the aspect of the present disclosure, an end portion of the first heat dissipation section in the third direction may be covered with the second heat dissipation section.

In the wavelength converter according to the aspect of the present disclosure, an end portion of the first heat dissipation section in a third direction that intersects the first and second directions may be covered with a protection member provided between the first heat dissipator and the second heat dissipator.

In the wavelength converter according to the aspect of the present disclosure, the thermal conductivity of the first heat dissipation section in the third direction may be higher than the thermal conductivity of the second heat dissipation section in the third direction.

The wavelength converter according to the aspect of the present disclosure may further include a metal film provided between the second surface and the first heat dissipation section.

In the wavelength converter according to the aspect of the present disclosure, the first heat dissipation section may contain graphite.

In the wavelength converter according to the aspect of the present disclosure, the first heat dissipation section may contain metal.

In the wavelength converter according to the aspect of the present disclosure, the second heat dissipation section may contain metal.

A light source apparatus according to another aspect of the present disclosure includes the wavelength converter according to the aspect of the present disclosure and a light source that outputs the excitation light to the wavelength converter along the first direction.

A projector according to another aspect of the present disclosure includes the light source apparatus according to the aspect of the present disclosure, a light modulator that modulates the light from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 5.

In the following drawings, components are drawn at different dimensional scales in some cases for clarity of each of the components.

An example of a projector according to the present embodiment will be descried.

Figure 1:
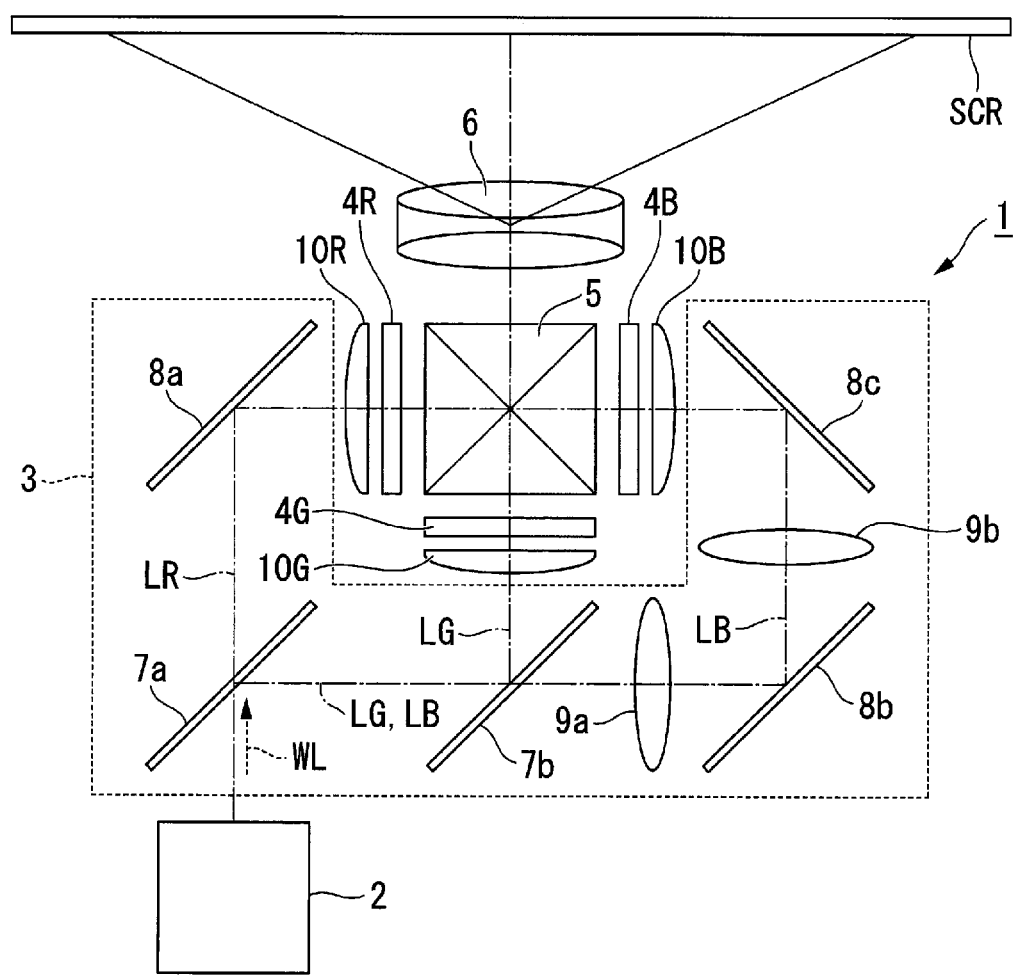
FIG. 1 is a schematic configuration diagram of a projector according to a first embodiment.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes an illuminator 2, a color separation system 3, a light modulator 4R, a light modulator 4G, a light modulator 4B, a light combining system 5, and a projection optical apparatus 6. The configuration of the illuminator 2 will be described later.

The color separation system 3 includes a first dichroic mirror 7a, a second dichroic mirror 7b, a reflection mirror 8a, a reflection mirror 8b, a reflection mirror 8c, a relay lens 9a, and a relay lens 9b. The color separation system separates illumination light WL outputted from the illuminator 2 into red light LR, green light LG, and blue light LB, guides the red light LR to the light modulator 4R, guides the green light LG to the light modulator 4G, and guides the blue light LB to the light modulator 4B.

A field lens 10R is disposed between the color separation system 3 and the light modulator 4R, substantially parallelizes incident light, and causes the resultant light to travel toward the light modulator 4R. A field lens 10G is disposed between the color separation system 3 and the light modulator 4G, substantially parallelizes incident light, and causes the resultant light to travel toward the light modulator 4G. A field lens 10B is disposed between the color separation system 3 and the light modulator 4B, substantially parallelizes incident light, and causes the resultant light to travel toward the light modulator 4B.

The first dichroic mirror 7a transmits a red light component and reflects a green light component and a blue light component. The second dichroic mirror 7b reflects the green light component and transmits the blue light component. The reflection mirror 8a reflects the red light component. The reflection mirrors 8b and 8c reflect the blue light component.

The red light LR having passed through the first dichroic mirror 7a is reflected off the reflection mirror 8a, passes through the field lens 10R, and is incident on an image formation area of the light modulator 4R for red light. The green light LG reflected off the first dichroic mirror 7a is further reflected off the second dichroic mirror 7b, passes through the field lens 10G, and is incident on an image formation area of the light modulator 4G for green light. The blue light LB having passed through the second dichroic mirror 7b travels via the relay lens 9a, the light-incident-side reflection mirror 8b, the relay lens 9b, the light-exiting-side reflection mirror 8c, and the field lens 10B and is incident on an image formation area of the light modulator 4B for blue light.

The light modulators 4R, 4G, and 4B each modulate the color light incident thereon in accordance with image information to form image light. The light modulators 4R, 4G, and 4B are each formed of a liquid crystal light valve. Although not shown, a light-incident-side polarizer is disposed on the light incident side of each of the light modulators 4R, 4G, and 4B. A light-exiting-side polarizer is disposed on the light exiting side of each of the light modulators 4R, 4G, and 4B.

The light combining system 5 combines the image light fluxes outputted from the light modulators 4R, 4G, and 4B with one another to form full-color image light. The light combining system 5 is formed of a cross dichroic prism formed of four right angled prisms bonded to each other and having a substantially square shape in a plan view. Dielectric multilayer films are formed along the substantially X-letter-shaped interfaces between the right angled prisms bonded to each other.

The image light having exited out of the light combining system 5 is enlarged and projected onto the screen SCR by the projection optical apparatus 6. That is, the projection optical apparatus 6 projects the light fluxes modulated by the light modulators 4R, 4G, and 4B. The projection optical apparatus 6 is formed of a plurality of projection lenses.

An example of the illuminator 2 in the present embodiment will be described.

Figure 2:
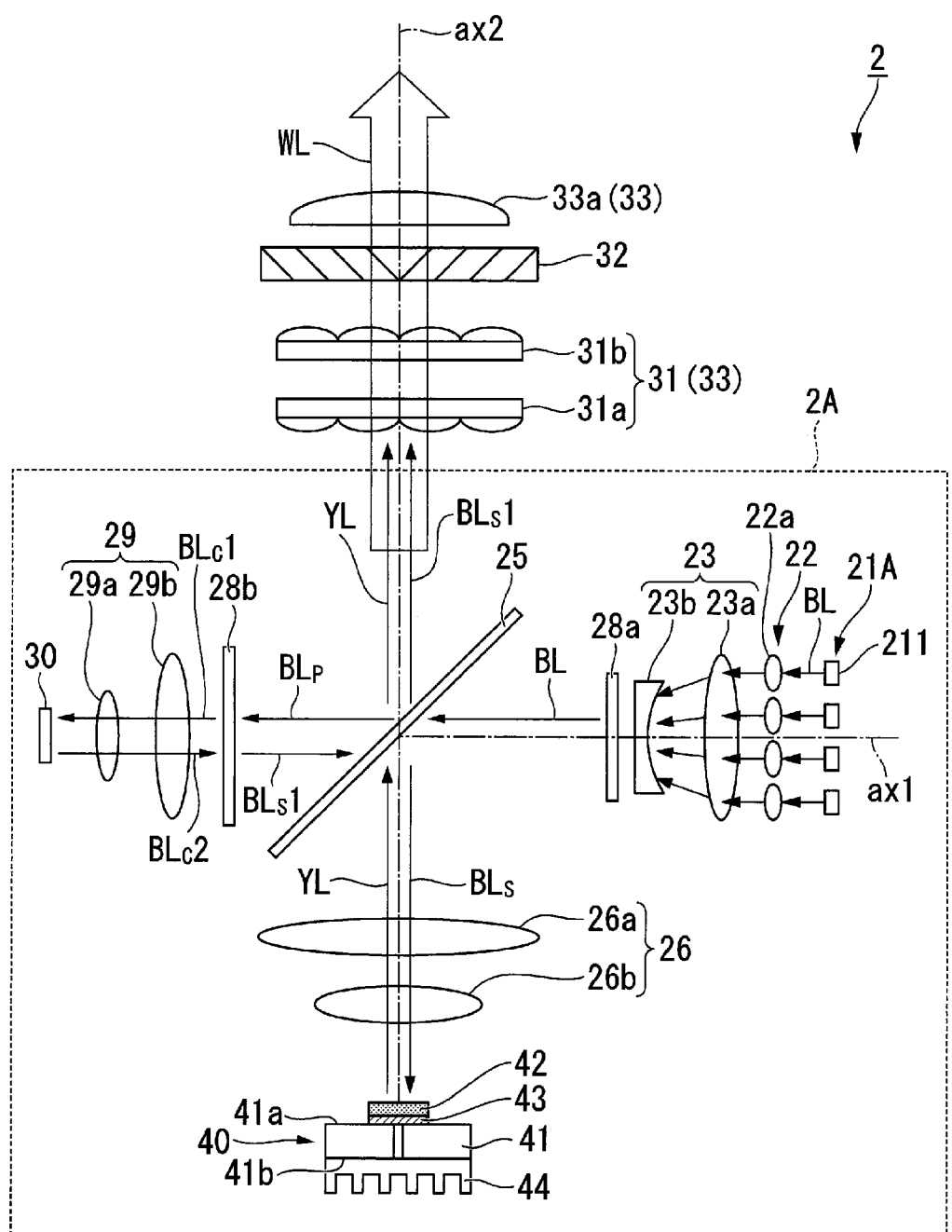
FIG. 2 is a schematic configuration diagram of an illuminator.

FIG. 2 shows a schematic configuration of the illuminator 2.

The illuminator 2 includes a light source apparatus 2A, an optical integration system 31, a polarization converter 32, and a superimposing lens 33a, as shown in FIG. 2. The optical integration system 31 and the superimposing lens 33a form a superimposing system 33.

The light source apparatus 2A includes an array light source 21A, a collimator system 22, an afocal system 23, a first retardation film 28a, a polarization separator 25, a first light collection system 26, a wavelength converter 40, a second retardation film 28b, a second light collection system 29, and a diffusive reflector 30.

The array light source 21A, the collimator system 22, the afocal system 23, the first retardation film 28a, the polarization separator 25, the second retardation film 28b, the second light collection system 29, and the diffusive reflector 30 are sequentially arranged along an optical axis ax1. The wavelength converter 40, the first light collection system 26, the polarization separator 25, the optical integration system 31, the polarization converter 32, and the superimposing lens 33a are sequentially arranged along an illumination optical axis ax2. The optical axis ax1 and the illumination optical axis ax2 are present in the same plane and perpendicular to each other.

The array light source 21A includes a plurality of semiconductor lasers 211, which each serve as a solid-state light source. The plurality of semiconductor lasers 211 are arranged in an array in a plane perpendicular to the optical axis ax1. The semiconductor lasers 211 each output a blue light beam BL that belongs to a first wavelength band, specifically, laser light that belongs to a first wavelength band having intensity that peaks, for example, at wavelength of 460 nm, for example). The array light source 21A outputs a light beam flux formed of a plurality of light beams BL. The array light source 21A in the present embodiment corresponds to the "light source" in the appended claims.

The light beams BL outputted from the array light source 21A enter the collimator system 22. The collimator system 22 converts the light beams BL outputted from the array light source 21A into parallelized light. The collimator system 22 is formed of a plurality of collimator lenses 22a arranged in an array. The plurality of collimator lenses 22a are disposed in correspondence with the plurality of semiconductor lasers 211.

The light beams BL having passed through the collimator system 22 enter the afocal system 23. The afocal system 23 adjusts the thickness (diameter) of the light flux formed of the light beams BL. The afocal system 23 is formed, for example, of a convex lens 23a and a concave lens 23b.

The light beams BL having passed through the afocal system 23 enter the first retardation film 28a. The first retardation film 28a is, for example, a half wave plate configured to be rotatable. The light beams BL outputted from the semiconductor lasers 211 are each linearly polarized light. Appropriately setting the angle of rotation of the first retardation film 28a allows each of the light beams BL passing through the first retardation film 28a to be a light beam containing an S-polarized component and a P-polarized component with respect to the polarization separator 25 mixed with each other at a predetermined ratio. The ratio between the S-polarized component and the P-polarized component can be changed by rotating the first retardation film 28a.

The light beams BL each containing the S-polarized component and the P-polarized component produced when the light beam BL passes through the first retardation film 28a are incident on the polarization separator 25. The polarization separator 25 is formed, for example, of a polarization beam splitter having wavelength selectivity. The polarization separator 25 inclines by 45° with respect to the optical axis ax1 and the illumination optical axis ax2.

The polarization separator 25 has a polarization separation function of separating each of the light beams BL into a light beam $BL_S$, which is formed of the S-polarized light component with respect to the polarization separator 25, and a light beam $BL_P$, which is formed of the P-polarized light component with respect to the polarization separator 25. Specifically, the polarization separator 25 reflects the light beams $BL_S$, which are each formed of the S-polarized light component, and transmits the light beams $BL_P$, which are each formed of the P-polarized light component. The polarization separator 25 further has a color separation function of transmitting a yellow light component, which belongs to a wavelength band different from the wavelength band to which the blue light beams BL belong, irrespective of the polarization state of the yellow light component in addition to the polarization separation function.

The S-polarized light beams $BL_S$ reflected off the polarization separator 25 enter the first light collection system 26. The first light collection system 26 causes the light beams $BL_S$ to converge toward the wavelength converter 40. The first light collection system 26 is formed of a first lens 26a and a second lens 26b. The first lens 26a and the second lens 26b are each formed of a convex lens. The light beams $BL_S$ having exited out of the first light collection system 26 are incident in the form of a collected light flux on the wavelength converter 40.

The wavelength converter 40 includes a base 41, a wavelength conversion layer 42, a reflection layer 43, and a heat sink 44. In the present embodiment, the wavelength conversion layer 42 is formed of a phosphor. In the present embodiment, a fixed wavelength converter configured not to be rotatable, for example, with a motor is used as the wavelength converter 40.

The wavelength conversion layer 42 is held on the base 41 via a bonding material (not shown). The bonding material is, for example, a nano-silver sintered metal material. The wavelength conversion layer 42 converts part of the excitation light incident thereon into the fluorescence YL, which belongs to a second wavelength band different from the first wavelength band to which the excitation light belongs. The reflection layer 43 reflects the light incident thereon from the wavelength conversion layer 42 toward the first light collection system 26.

The heat sink 44 includes a plurality of fins. The heat sink 44 is so provided as to face the wavelength conversion layer 42 with the base 41 sandwiched therebetween. The heat sink 44 is fixed to the base 41 with the aid, for example, of metal bonding. In the wavelength converter 40, heat dissipation via the heat sink 44 can prevent thermal degradation of the wavelength conversion layer 42. The configuration of the wavelength converter 40 will be described later in detail.

The yellow fluorescence YL produced by the wavelength converter 40 is parallelized by the first light collection system 26 and then incident on the polarization separator 25.

Since the polarization separator 25 is characterized in that it transmits the yellow light component irrespective of the polarization state thereof, as described above, the fluorescence YL passes through the polarization separator 25.

On the other hand, the P-polarized light beams $BL_P$ having passed through the polarization separator 25 enter the second retardation film 28b. The second retardation film 28b is formed of a quarter wave plate disposed in the optical path between the polarization separator 25 and the diffusive reflector 30. The P-polarized light beams $BL_P$ having passed through the polarization separator 25 are converted by the second retardation film 28b, for example, into right-handed circularly polarized blue light $BL_c1$, which then enters the second light collection system 29.

The second light collection system 29 is formed of a first lens 29a and a second lens 29b. The first lens 29a and a second lens 29b are each formed of a convex lens. The second light collection system 29 causes the blue light $BL_c1$ to converge and impinge on the diffusive reflector 30.

The diffusive reflector 30 is disposed in the optical path of the light beams $BL_p$ having passed through the polarization separator 25 and diffusively reflects the blue light $BL_c1$ having exited out of the second light collection system 29 toward the polarization separator 25. The diffusive reflector 30 desirably reflects the blue light $BL_c1$ in a Lambertian reflection scheme but does not disturb the polarization state of the blue light $BL_c1$.

The light diffusively reflected off the diffusive reflector 30 is hereinafter referred to as blue light $BL_c2$. In the present embodiment, diffusively reflecting the blue light $BL_c1$ results in blue light $BL_c2$ having a substantially uniform illuminance distribution. For example, the diffusive reflector 30 diffusively reflects the right-handed circularly polarized blue light $BL_c1$ into the left-handed circularly polarized blue light $BL_c2$.

The blue light $BL_c2$ is converted by the second light collection system 29 into parallelized light and then enters the second retardation film 28b again. The left-handed circularly polarized blue light $BL_c2$ is converted by the second retardation film 28b into S-polarized blue light $BL_S1$. The S-polarized blue light $BL_S1$ is reflected off the polarization separator 25 toward the optical integration system 31.

The blue light $BL_S1$ is thus combined with the fluorescence YL having passed through the polarization separator 25, and the combined light is used as the illumination light WL. That is, the blue light $BL_S1$ and the fluorescence YL exit out of the polarization separator 25 in the same direction to form the white illumination light WL, which is the combination of the blue light $BL_S1$ and the fluorescence (yellow light) YL.

The illumination light WL exits toward the optical integration system 31. The optical integration system 31 is formed of a first lens array 31a and a second lens array 31b. The first lens array 31a and the second lens array 31b are each formed of a plurality of lenses arranged in an array.

The illumination light WL having passed through the optical integration system 31 enters the polarization converter 32. The polarization converter 32 includes polarization separation films and retardation films. The polarization converter 32 converts the illumination light WL containing the non-polarized fluorescence YL into linearly polarized light to be incident on the light modulators 4R, 4G, and 4B.

The illumination light WL having passed through the polarization converter 32 enters the superimposing lens 33a. The superimposing lens 33a cooperates with the optical integration system 31 to homogenize the illuminance distribution of the illumination light WL in an area illuminated therewith. The illuminator 2 thus produces the illumination light WL.

The configuration of the wavelength converter 40 will be described below.

Figure 3:
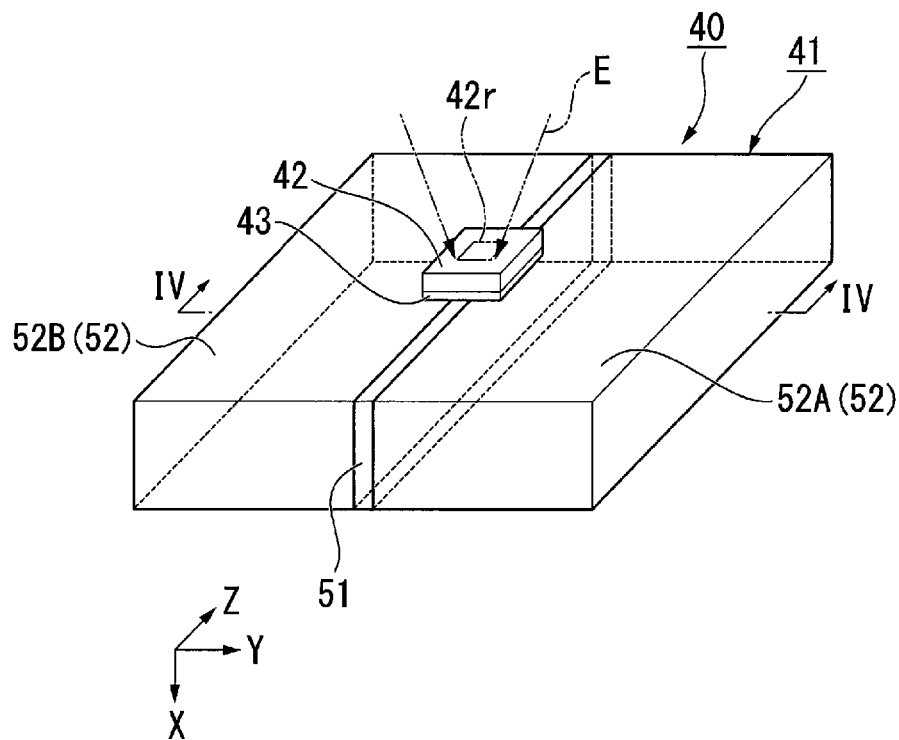
FIG. 3 is a perspective view of a wavelength converter.
Figure 4:
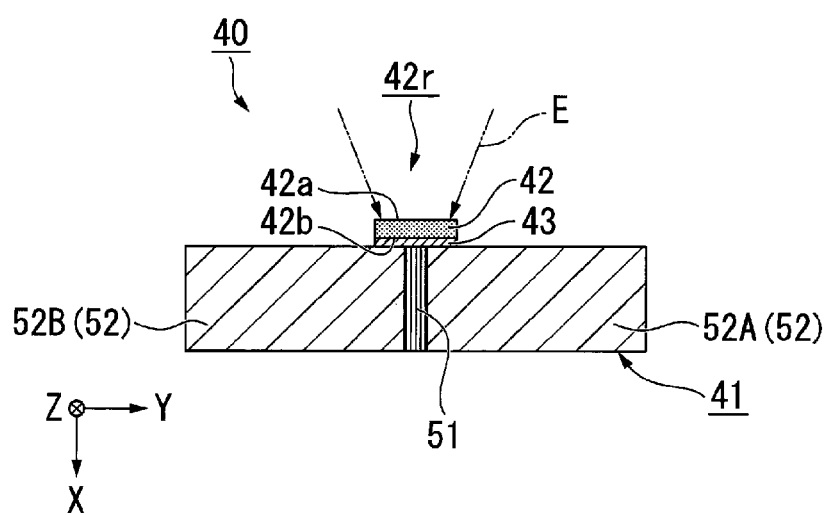
FIG. 4 is a cross-sectional view of the wavelength converter.
Figure 5:
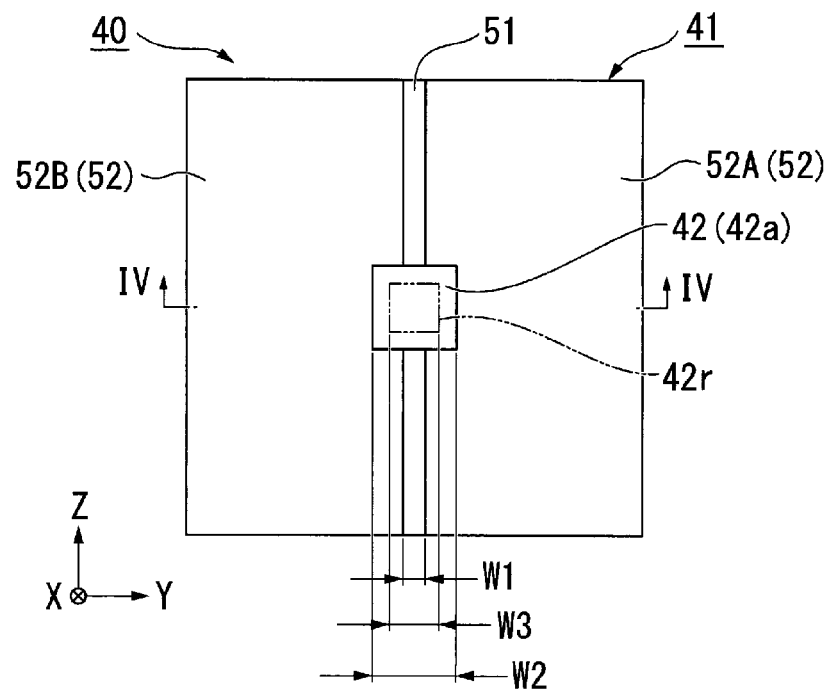
FIG. 5 is a plan view of the wavelength converter.

FIG. 3 is a perspective view of the wavelength converter 40. FIG. 4 is a cross-sectional view of the wavelength converter 40 taken along the line IV-IV in FIGS. 3 and 5. FIG. 5 is a plan view of the wavelength converter 40. In FIGS. 3 to 5, the heat sink 44 is omitted.

The wavelength conversion layer 42 has a first surface 42a, on which excitation light E is incident, and a second surface 42b, which differs from the first surface 42a, as shown in FIG. 4. The wavelength conversion layer 42 has a rectangular shape when viewed in the direction perpendicular to the first surface 42a, as shown in FIG. 5. In the present embodiment, out of the first surface 42a of the wavelength conversion layer 42, an area 42r, on which the excitation light E is incident, has a rectangular shape smaller than the outer shape of the wavelength conversion layer 42.

A view viewed along the direction perpendicular to the first surface 42a of the wavelength converter 40 is hereinafter referred to as a plan view. Further, out of the first surface 42a of the wavelength conversion layer 42, the area 42r, on which the excitation light E is incident, is defined as a light incident area 42r. The direction perpendicular to the first surface 42a of the wavelength conversion layer 42 is defined as a direction X (first direction). The direction which is perpendicular to the direction X and in which a first heat dissipator, a first heat dissipation section, and a second heat dissipator, which will all be described later, are arranged is defined as a direction Y (second direction). The direction perpendicular to the directions X and Y is defined as a direction Z (third direction).

The wavelength conversion layer 42 contains a ceramic phosphor that converts the excitation light E into fluorescence YL, which belongs to the second wavelength band different from the first wavelength band to which the excitation light E belongs. The second wavelength band ranges, for example, from 490 to 750 nm, and the fluorescence YL is yellow light containing the green light component and the red light component. The wavelength conversion layer 42 may contain a single crystal phosphor.

The wavelength conversion layer 42 contains, for example, an yttrium-aluminum-garnet-based (YAG-based) phosphor. Consider YAG:Ce, which contains cerium (Ce) as an activator by way of example, and the wavelength conversion layer 42 can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, or a thermal plasma method or any other gas-phase method.

The base 41 is so provided as to face the second surface 42b of the wavelength conversion layer 42. The reflection layer 43 is provided between the second surface 42b of the wavelength conversion layer 42 and the base 41. A surface of the base 41 that is the surface facing the second surface 42b of the wavelength conversion layer 42 is in contact with the reflection layer 43. The base 41 includes a first heat dissipation section 51 and a second heat dissipation section 52. In the present embodiment, the second heat dissipation section 52 includes a first heat dissipator 52A and a second heat dissipator 52B, and the first heat dissipation section 51 is sandwiched between the first heat dissipator 52A and the second heat dissipator 52B along the direction Y. The first heat dissipation section 51 is so provided as to be in contact with the first heat dissipator 52A in the direction Y. The first heat dissipation section 51 is so provided as to be in contact with the second heat dissipator 52B in the direction Y. The first heat dissipation section 51 is so provided as to face part of the light incident area 42r, which is part of the first surface 42a of the wavelength conversion layer 42 and on which the excitation light E is incident.

The reflection layer 43 is provided between the first heat dissipation section 51 and the second surface 42b of the wavelength conversion layer 42. The second surface 42b of the wavelength conversion layer 42 is in contact with the reflection layer 43. A surface of the first heat dissipation section 51 that is the surface facing the second surface 42b of the wavelength conversion layer 42 is in contact with the reflection layer 43. Similarly, the reflection layer 43 is provided between the first heat dissipator 52A and the second surface 42b of the wavelength conversion layer 42. A surface of the first heat dissipator 52A that is the surface facing the second surface 42b of the wavelength conversion layer 42 is in contact with the reflection layer 43. Further similarly, the reflection layer 43 is provided between the second heat dissipator 52B and the second surface 42b of the wavelength conversion layer 42. A surface of the second heat dissipator 52B that is the surface facing the second surface 42b of the wavelength conversion layer 42 is in contact with the reflection layer 43.

The first heat dissipation section 51 and the second heat dissipation section 52 are made of materials different from each other. The first heat dissipation section 51 is made of a material containing graphite. The material containing graphite may further contain metal, for example, as in the case of copper graphite that is graphite impregnated with copper. The material containing graphite has anisotropy in thermal conductivity. On the other hand, the second heat dissipation section 52 is made, for example, of a material containing copper, aluminum, or any other metal. A material containing any of the metals described above has no anisotropy in thermal conductivity. The first heat dissipator 52A and the second heat dissipator 52B are made of the same metal material in terms of dimensions, material, thermal conductivity, and other factors. The first heat dissipator 52A and the second heat dissipator 52B may be made of materials different from each other in terms of dimensions, material, thermal conductivity, and other factors.

Graphite has a hexagonal-plate-shaped crystal structure and includes a large number of layers. A plurality of carbon atoms in each of the layers are strongly bonded to each other based on covalent bond, whereas two layers adjacent to each other are weakly bonded to each other based on Van der Waals force. Graphite is therefore characterized in that the layers thereof tend to separate from each other. As for the thermal conductivity, the layers each have the same thermal conductivity in any direction, but the thermal conductivity in each of the layers differs from the thermal conductivity between adjacent two layers. That is, graphite has relatively large thermal conductivity in two directions perpendicular to each other in each of the layers and has relatively small thermal conductivity in the direction in which the plurality of layers are layered on each other. A material containing graphite thus has anisotropy in thermal conductivity.

The first heat dissipation section 51 in the present embodiment is made of a graphite-containing material so disposed that the two directions perpendicular to each other in each of the layers correspond to the directions X and Z and the direction in which the plurality of layers are layered on each other corresponds to the direction Y. As an example, the thermal conductivity of graphite in each of the directions X and Z is about 1700 W/m·K, and the thermal conductivity of graphite in the direction Y is about 7 W/m·K. The thermal conductivity of copper graphite in each of the directions X and Z is about 650 W/m·K, and the thermal conductivity of copper graphite in the direction Y is about 30 W/m·K.

In contrast, since the metal material of which the second heat dissipation section 52 is made has no anisotropy in thermal conductivity, the second heat dissipation section 52 has the same thermal conductivity in all directions. As an example, the thermal conductivity of copper in each of the directions X, Y, and Z is about 380 W/m·K.

As described above, the thermal conductivity of the second heat dissipation section 52 in the direction X perpendicular to the first surface 42a of the wavelength conversion layer 42 is lower than that of the first heat dissipation section 51. Conversely, the thermal conductivity of the first heat dissipation section 51 in the direction X perpendicular to the first surface 42a of the wavelength conversion layer 42 is higher than that of the second heat dissipation section 52. The thermal conductivity of the first heat dissipation section 51 in the direction Y is lower than the thermal conductivity of the second heat dissipation section 52 in the direction Y. The thermal conductivity of the first heat dissipation section 51 in the direction Z is higher than the thermal conductivity of the second heat dissipation section 52 in the direction Z.

In the present embodiment, a dimension W1 of the first heat dissipation section 51 in the direction Y is smaller than a dimension W2 of the wavelength conversion layer 42 in the direction Y in the plan view viewed along the direction X and smaller than a size W3 of the light incident area 42r in the direction Y in the plan view viewed along the direction X, as shown in FIG. 5. Therefore, part of the wavelength conversion layer 42 overlaps with the first heat dissipation section 51, and part of the light incident area 42r overlaps with the first heat dissipation section 51 in the plan view viewed along the direction X.

The present inventor has assumed a wavelength converter according to Comparative Example shown below to examine graphite having high thermal conductivity as the material of a base that supports a wavelength conversion layer.

Figure 14:
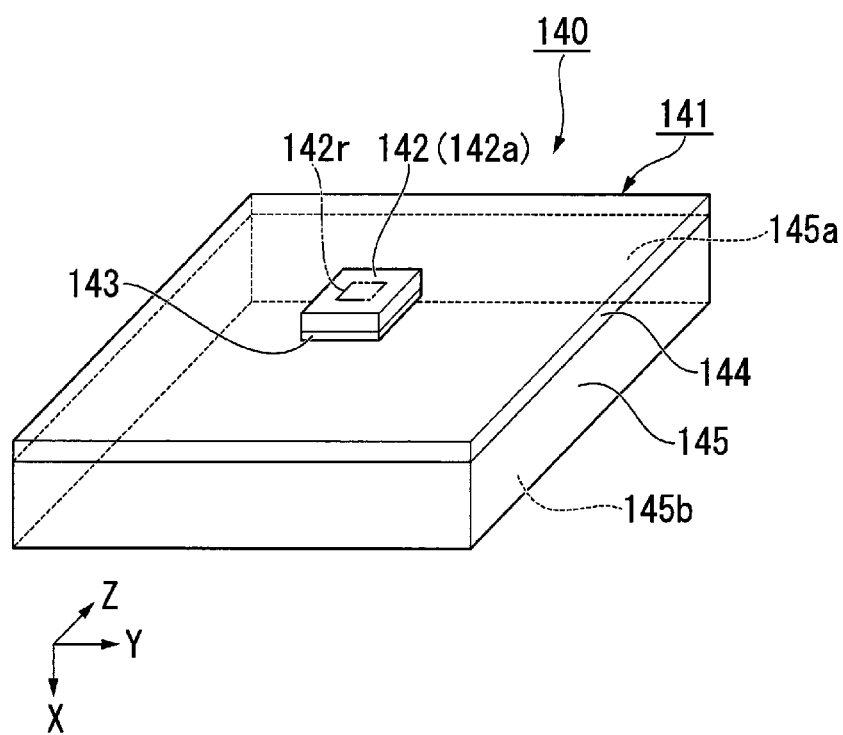
FIG. 14 is a perspective view of a wavelength converter according to Comparative Example.

FIG. 14 is a perspective view of a wavelength converter 140 according to Comparative Example.

The wavelength converter 14 according to Comparative Example includes a wavelength conversion layer 142, a reflection layer 143, and a base 141, as shown in FIG. 14. The base 141 includes a graphite layer 144 and a copper layer 145. The graphite layer 144 is layered on a first surface 145a of the copper layer 145. That is, the wavelength converter 140 according to Comparative Example differs from the wavelength converter 40 according to the present embodiment in that the graphite layer 144 and the copper layer 145 are juxtaposed along the direction X. The thermal conductivity of the graphite layer 144 in the direction X is 7 W/m·K, and the thermal conductivity of the graphite layer 144 in each of the directions Y and Z is 1700 W/m·K. The thermal conductivity of the copper layer 144 in each of the directions X, Y, and Z is about 380 W/m·K.

The present inventor performed a simulation on the wavelength converter 140 according to Comparative Example. In the simulation, the temperature at the first surface 142a of the wavelength conversion layer 142 was calculated with the thickness of the graphite layer 144 changed. The first surface 142a is the surface on which excitation light is incident. An area 142r of the first surface 142a of the wavelength conversion layer 42 that is the area on which the excitation light is incident is defined as a light incident area 142r.

The simulation was performed under the following conditions: The dimension of the wavelength conversion layer 142 was 1 mm×1 mm; the thickness of the wavelength conversion layer 142 was 50 μm; the material of the wavelength conversion layer 142 was YAG ceramic containing Ce as the activator; and the thermal conductivity of the YAG ceramic was 9 W/m·K. The size of the light incident area 142r, on which the excitation light was incident, was 0.8× 0.8 mm. The amount of excitation light was 40 W, and it was assumed that heat was so dissipated via a second surface 145b of the copper layer 145 that the temperature at the second surface 145b of the copper layer 145 was fixed at 60° C.

That is, the conditions of the simulation were set as follows: The dimension of the wavelength conversion layer 142 in the direction Y was 1 mm; the dimension of the wavelength conversion layer 142 in the direction Z was 1 mm; and the dimension of the wavelength conversion layer 142 in the direction X was 50 μm. The sizes of the light incident area 42r, on which the excitation light E was incident, in the directions Y and Z were both 0.8 mm.

The thickness of the graphite layer 144 was changed to the following five values: 0 mm; 0.010 mm; 0.025 mm; 0.050 mm; and 0.075 mm. The case where the thickness of the graphite layer 144 was 0 mm is a case where the base 141 was entirely formed of the copper layer 145 and no graphite layer 144 was therefore present.

Table 1 shows the relationship between the thickness of the graphite layer 144 and the temperature at the first surface 142a of the wavelength conversion layer 142.

TABLE 1

| Thickness of graphite layer (mm) | Maximum temperature at phosphor surface (° C.) |
|---|---|
| 0 | 223.13 |
| 0.010 | 370.58 |
| 0.025 | 496.51 |
| 0.050 | 544.70 |
| 0.075 | 584.89 |

Figure 15:
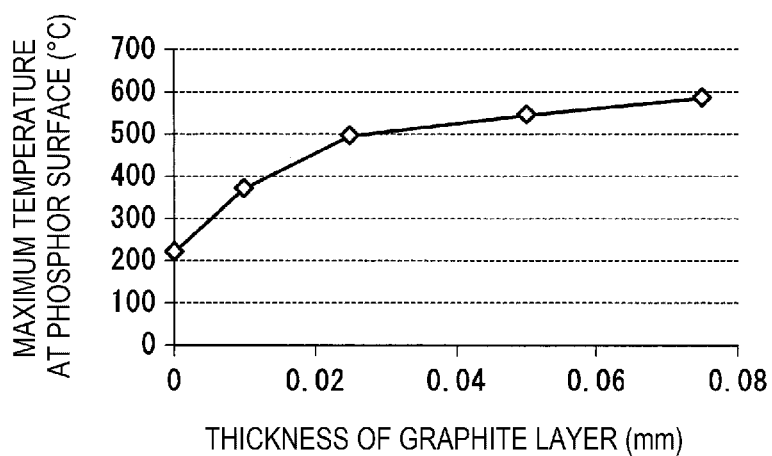
FIG. 15 shows a graph illustrating the relationship between the thickness of a graphite layer and a maximum temperature at a phosphor surface in the wavelength converter according to Comparative Example.

FIG. 15 is a graphic [Table 1] and shows a graph illustrating the relationship between the thickness of the graphite layer 144 and the temperature at the first surface 142a of the wavelength conversion layer 142 in the wavelength converter 140 according to Comparative Example. The horizontal axis of FIG. 15 represents the thickness (mm) of the graphite layer 144, and the vertical axis of FIG. 15 represents a maximum temperature (° C.) at the first surface 142a of the wavelength conversion layer 142. A maximum temperature at the first surface 142a of the wavelength conversion layer 142 was employed as the temperature in Table 1 because the temperature at the first surface 142a has a predetermined distribution.

When no graphite layer 144 is present and the base 141 is entirely formed of the copper layer 145, that is, when the thickness of the graphite layer 144 is 0 mm, the maximum temperature at the first surface 142a of the wavelength conversion layer 142 was about 223° C., as shown in FIG. 15. In contrast, adding the graphite layer 144 tends to cause an increase in the maximum temperature at the first surface 142a of the wavelength conversion layer 142. For example, when the thickness of the graphite layer 144 is 0.075 mm, the simulation shows that the maximum temperature at the first surface 142a of the wavelength conversion layer 142 was higher than 580° C. That is, in the case of the wavelength converter 140 according to Comparative Example, it was demonstrated that the thicker the graphite layer 144, the lower the heat dissipation performance.

According to the present inventor's speculation about the reason of the aforementioned decrease in the heat dissipation performance, it is conceivable first of all that the wavelength converter 140 according to Comparative Example has high thermal conductivity in the in-plane directions of the graphite layer 144 (directions Y and Z in FIG. 14) that extend along the first surface 142a of the wavelength conversion layer 142, so that heat is likely to be conducted in the in-plane directions in the graphite layer 144. As a second reason for the aforementioned decrease in the heat dissipation performance, it is conceivable that the thermal conductivity of the graphite layer 144 in the direction perpendicular to the first surface 142a of the wavelength conversion layer 142 (direction X in FIG. 14) is lower than the thermal conductivity of the copper layer 145 in the direction X, so that heat is unlikely to be conducted in the direction X in the graphite layer 144. From the reasons described above, it is conceivable that heat is unlikely to be conducted from the graphite layer 144 to the copper layer 145.

In view of the speculation described above, the present inventor has come up with an idea of improvement in the heat dissipation performance by using the anisotropy in thermal conductivity of graphite to orient graphite in such a way that the high thermal conductivity direction coincides with the thickness direction of the base so that heat is likely to be conducted in the thickness direction of the base and further disposing a metal material having no anisotropy in thermal conductivity, such as copper, in such a way that the metal material is in contact with the graphite so that heat is likely to be conducted also in the in-plane directions of the base. The present inventor has thus achieved the configuration of the wavelength converter 40 according to the present embodiment.

As described above, in the wavelength converter 40 according to the present embodiment, in which the first heat dissipation section 51, the thermal conductivity of which in the direction X is higher than that of the second heat dissipation section 52, is so provided as to face the light incident area 42r of the wavelength conversion layer 42, the heat generated by the wavelength conversion layer 42 is sufficiently diffused in the direction X by the first heat dissipation section 51. Further, since the thermal conductivity of the first heat dissipation section 51 in the direction Z is higher than that of the heat dissipation section 52, the heat transferred to the first heat dissipation section 51 is sufficiently diffused also in the direction Z. Moreover, since the first heat dissipator 52A and the second heat dissipator 52B, the thermal conductivity of each of which in the direction Y is higher than that of the first heat dissipation section 51, sandwich the first heat dissipation section 51 in the direction Y, the heat transferred to the first heat dissipation section 51 is transferred to the second heat dissipation section 52 and then sufficiently diffused in the direction Y by the second heat dissipation section 52.

As described above, the wavelength converter 40 according to the present embodiment causes the heat generated by the wavelength conversion layer 42 to be sufficiently diffused in all the directions in the base 41, whereby high heat dissipation performance is achieved, and an increase in the temperature of the wavelength conversion layer 42 is therefore suppressed. A wavelength converter 40 having high light emission efficiency can thus be achieved. That is, the wavelength converter 40 according to the present embodiment can provide high heat dissipation performance and high wavelength conversion efficiency.

Further, the light source apparatus 2A according to the present embodiment includes the wavelength converter 40 described above and can therefore have improved light emission efficiency. The projector 1 according to the present embodiment includes the light source apparatus 2A described above and can therefore produce a bright image.

Second Embodiment

A second embodiment of the present disclosure will be described below with reference to FIG. 6.

The configurations of a projector and an illuminator according to the second embodiment are the same as those in the first embodiment, and the configuration of the wavelength converter differs from that in the first embodiment. No overall description of the projector and the illuminator will therefore be made.

Figure 6:
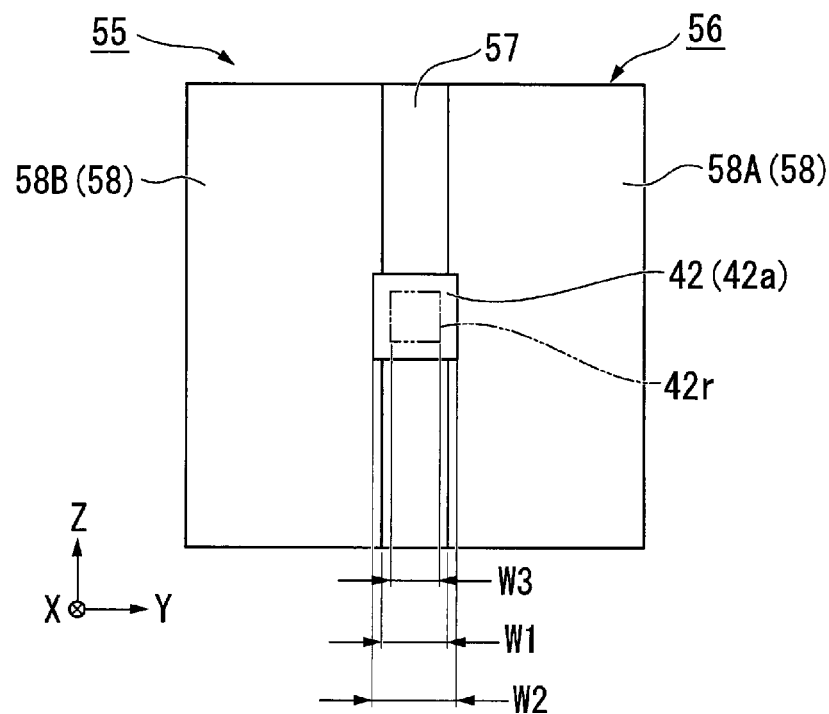
FIG. 6 is a plan view of a wavelength converter according to a second embodiment.

FIG. 6 is a plan view of a wavelength converter 55 according to the second embodiment.

In FIG. 6, components common to those in the figures used in the description of the first embodiment have the same reference characters and will not be described.

The wavelength converter 55 according to the second embodiment includes the wavelength conversion layer 42 and a base 56, as shown in FIG. 6. The base 56 includes a first heat dissipation section 57 and a second heat dissipation section 58. The second heat dissipation section 58 includes a first heat dissipator 58A and a second heat dissipator 58B, and the first heat dissipation section 57 is sandwiched between the first heat dissipator 58A and the second heat dissipator 58B along the direction Y. The first heat dissipation section 57 is so provided as to face the light incident area 42r, which is part of the first surface 42a of the wavelength conversion layer 42 and on which the excitation light E is incident.

In the second embodiment, the dimension W1 of the first heat dissipation section 57 in the direction Y is smaller than the dimension W2 of the wavelength conversion layer 42 in the direction Y but greater than the size W3 of the light incident area 42r in the direction Y in the plan view viewed along the direction X. Therefore, part of the wavelength conversion layer 42 overlaps with the first heat dissipation section 57, and the entire light incident area 42r overlaps with the first heat dissipation section 57 in the plan view viewed along the direction X.

The other configurations of the wavelength converter 55 are the same as those in the first embodiment.

Also in the second embodiment, high heat dissipation performance is achieved and an increase in the temperature of the wavelength conversion layer 42 is therefore suppressed, whereby the same effects as those provided in the first embodiment, such as high light emission efficiency of the wavelength converter 55, can be provided.

Third Embodiment

A third embodiment of the present disclosure will be described below with reference to FIG. 7.

The configurations of a projector and an illuminator according to the third embodiment are the same as those in the first embodiment, and the configuration of the wavelength converter differs from that in the first embodiment. No overall description of the projector and the illuminator will therefore be made.

Figure 7:
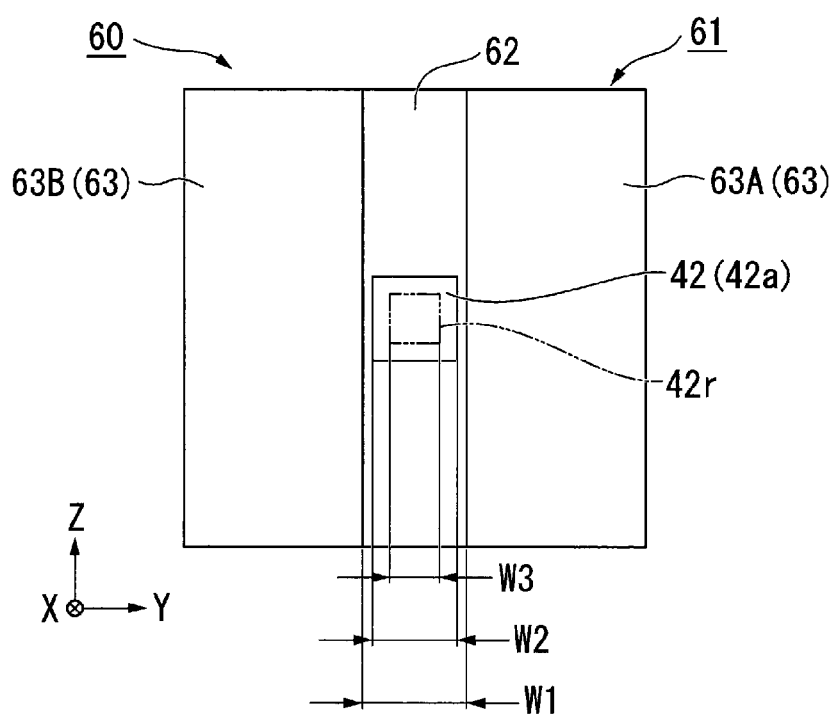
FIG. 7 is a plan view of a wavelength converter according to a third embodiment.

FIG. 7 is a plan view of a wavelength converter 60 according to the third embodiment.

In FIG. 7, components common to those in the figures used in the description of the first embodiment have the same reference characters and will not be described.

The wavelength converter 60 according to the third embodiment includes the wavelength conversion layer 42 and a base 61, as shown in FIG. 7. The base 61 includes a first heat dissipation section 62 and a second heat dissipation section 63. The second heat dissipation section 63 includes a first heat dissipator 63A and a second heat dissipator 63B, and the first heat dissipation section 62 is sandwiched between the first heat dissipator 63A and the second heat dissipator 63B along the direction Y. The first heat dissipation section 62 is so provided as to face the light incident area 42r, which is part of the first surface 42a of the wavelength conversion layer 42 and on which the excitation light E is incident.

In the third embodiment, the dimension W1 of the first heat dissipation section 62 in the direction Y is greater than the dimension W2 of the wavelength conversion layer 42 in the direction Y and greater than the size W3 of the light incident area 42r in the direction Y in the plan view viewed along the direction X. Therefore, the entire wavelength conversion layer 42 overlaps with the first heat dissipation section 62, and the entire light incident area 42r overlaps with the first heat dissipation section 62 in the plan view viewed along the direction X.

The other configurations of the wavelength converter 60 are the same as those in the first embodiment.

Also in the third embodiment, high heat dissipation performance is achieved and an increase in the temperature of the wavelength conversion layer 42 is therefore suppressed, whereby the same effects as those provided in the first embodiment, such as high light emission efficiency of the wavelength converter 60, can be provided.

In each of the wavelength converters 40, 55, and 60 according to the first to third embodiments described above, the configurations of first to third variations below can be employed.

First Variation

A first variation will be described below with reference to FIGS. 8 and 9.

Figure 8:
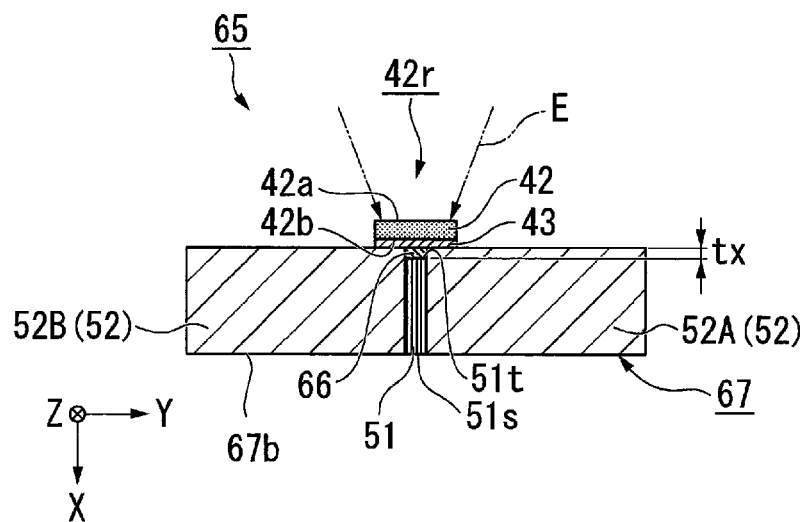
FIG. 8 is a cross-sectional view of a wavelength converter according to a first variation.

FIG. 8 is a cross-sectional view of a wavelength converter 65 according to the first variation.

In FIG. 8, components common to those in the figures used in the description of the first embodiment have the same reference characters and will not be described.

The wavelength converter 65 according to the first variation includes the wavelength conversion layer 42 and a base 67, as shown in FIG. 8. The base 67 includes the first heat dissipation section 51, the second heat dissipation section 63, and a protection layer 66. The second heat dissipation section 52 includes the first heat dissipator 52A and the second heat dissipator 52B. The first heat dissipation section 51 is sandwiched between the first heat dissipator 52A and the second heat dissipator 52B along the direction Y.

The base 67 is so provided as to face the second surface 42b of the wavelength conversion layer 42. The reflection layer 43 is provided between the second surface 42b of the wavelength conversion layer 42 and the base 67. A surface of the base 67 that is the surface facing the second surface 42b of the wavelength conversion layer 42 is in contact with the reflection layer 43. The base 67 includes the first heat dissipation section 51 and the second heat dissipation section 52. In the present variation, the second heat dissipation section 52 includes the first heat dissipator 52A and the second heat dissipator 52B, and the first heat dissipation section 51 is sandwiched between the first heat dissipator 52A and the second heat dissipator 52B along the direction Y. The first heat dissipation section 51 is so provided as to be in contact with the first heat dissipator 52A in the direction Y. The first heat dissipation section 51 is so provided as to be in contact with the second heat dissipator 52B in the direction Y. The first heat dissipation section 51 is so provided as to face part of the light incident area 42r, which is part of the first surface 42a of the wavelength conversion layer 42 and on which the excitation light E is incident.

The reflection layer 43 is provided between the first heat dissipation section 51 and the second surface 42b of the wavelength conversion layer 42. The second surface 42b of the wavelength conversion layer 42 is in contact with the reflection layer 43. The reflection layer 43 is provided between the first heat dissipator 52A and the second surface 42b of the wavelength conversion layer 42. A surface of the first heat dissipator 52A that is the surface facing the second surface 42b of the wavelength conversion layer 42 is in contact with the reflection layer 43. The reflection layer 43 is provided between the second heat dissipator 52B and the second surface 42b of the wavelength conversion layer 42. A surface of the second heat dissipator 52B that is the surface facing the second surface 42b of the wavelength conversion layer 42 is in contact with the reflection layer 43.

The protection layer 66 is provided on a direction-X-side first end surface 51t of the first heat dissipation section 51, which is the end surface facing the second surface 42b of the wavelength conversion layer 42. That is, the protection layer 66 is interposed between the wavelength conversion layer 42 and the heat dissipation section 51. A surface of the reflection layer 43 that is the surface facing the second surface 42b of the wavelength conversion layer 42 is in contact with the second surface 42b of the wavelength conversion layer 42, and a surface of the reflection layer 43 that is the surface facing the protection layer 66 is in contact with the protection layer 66. The protection layer 66 may instead be provided on a second end surface 51s, which differs from the first end surface 51t.

The protection layer 66 may be formed of a copper/gold laminate film or a nickel/copper/gold laminate film. That is, the wavelength conversion layer 42, the reflection layer 43, a first layer (layer containing gold) of the protection layer 66, a second layer (layer containing copper) of the protection layer 66, and the first heat dissipation section 51 may be sequentially layered on each other in the direction from the wavelength conversion layer 42 toward the first heat dissipation section 51. Instead, the wavelength conversion layer 42, the reflection layer 43, a first layer (layer containing gold) of the protection layer 66, a second layer (layer containing copper) of the protection layer 66, a third layer (layer containing nickel) of the protection layer 66, and the first heat dissipation section 51 may be sequentially layered on each other in the direction from the wavelength conversion layer 42 toward the first heat dissipation section 51. The material of the first layer of the protection layer 66, which is the layer so disposed as to be closest to the wavelength conversion layer 42, may be selected as appropriate in accordance with the bonding material that bonds the wavelength conversion layer 42 to the base 67. That is, when the bonding material is, for example, a nano-silver sintered metal material, the first layer of the second surface 42b of the wavelength conversion layer 42 is desirably made of gold. The protection layer 66 is formed by plating a metal on the direction-X-side first end surface 51t of the first heat dissipation section 51, which is the end surface facing the second surface 42b of the wavelength conversion layer 42.

The protection layer 66 may have the form shown in FIG. 9 below.

Figure 9:
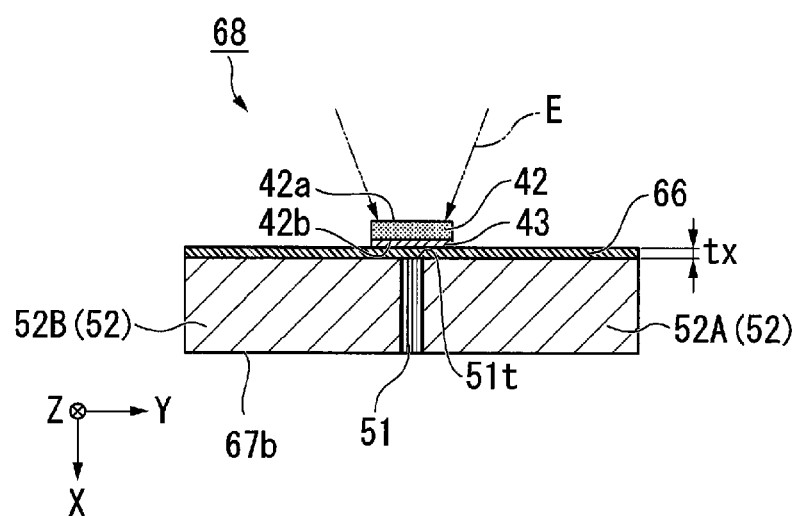
FIG. 9 is a cross-sectional view of another wavelength converter according to the first variation.

FIG. 9 is a cross-sectional view of another wavelength converter 68 according to the first variation.

In FIG. 9, components common to those in the figures used in the description of the first embodiment have the same reference characters and will not be described.

In the wavelength converter 68, the protection layer 66 is provided not only on the direction-X-side first end surface 51t of the first heat dissipation section 51, which is the end surface facing the second surface 42b of the wavelength conversion layer 42, but on a surface of the second heat dissipation section 52 that is the surface facing the second surface 42b of the wavelength conversion layer 42, as shown in FIG. 9. That is, the reflection layer 43 and the protection layer 66 are provided between the first heat dissipator 52A and the second surface 42b of the wavelength conversion layer 42. A surface of the first heat dissipator 52A that is the surface facing the second surface 42b of the wavelength conversion layer 42 is in contact with the protection layer 66. The reflection layer 43 and the protection layer 66 are provided between the second heat dissipator 52B and the second surface 42b of the wavelength conversion layer 42. A surface of the second heat dissipator 52B that is the surface facing the second surface 42b of the wavelength conversion layer 42 is in contact with the protection layer 66.

The present inventor performed a simulation on the wavelength converter 65 according to first variation. In the simulation, the temperature at the first surface 42a of the wavelength conversion layer 42 was calculated with the dimension of the first heat dissipation section 51 in the direction Y changed. The first surface 42a is the surface on which excitation light E is incident. The area 42r of the first surface 42a of the wavelength conversion layer 42 that is the area on which the excitation light E is incident is defined as the light incident area 42r.

The simulation was performed under the following conditions: The dimension of the wavelength conversion layer 42 was 1 mm×1 mm; the thickness of the wavelength conversion layer 42 was 50 μm; the material of the wavelength conversion layer 42 was YAG ceramic containing Ce as the activator; and the thermal conductivity of the YAG ceramic was 9 W/m·K. The size of the light incident area 142r, on which the excitation light E was incident, was 0.8×0.8 mm. The thermal conductivity of the first heat dissipation section 51 in each of the directions X and Z was 1700 W/m·K, and the thermal conductivity of the first heat dissipation section 51 in the direction Y was 7 W/m·K. The thermal conductivity of the second heat dissipation section 52 in each of the directions X, Y, and Z was 380 W/m·K. The amount of excitation light was 40 W, and it was assumed that heat was so dissipated via a second surface 67b of the base 67 that the temperature at the second surface 67b of the base 67 was fixed at 60° C.

That is, the conditions of the simulation were set as follows: The dimension of the wavelength conversion layer 42 in the direction Y was 1 mm; the dimension of the wavelength conversion layer 42 in the direction Z was 1 mm; and the dimension of the wavelength conversion layer 42 in the direction X was 50 μm. The sizes of the light incident area 42r, on which the excitation light E was incident, in the directions Y and Z were both 0.8 mm.

The material of the protection layer 66 was plated copper, and the thickness tx (dimension in direction X) of the protection layer 66 was changed to the following six values: 0.02 mm; 0.05 mm; 0.10 mm; 0.20 mm; 0.50 mm; and 1.00 mm. The case where the dimension of the first heat dissipation section 51 in the direction Y was 0 mm corresponds to a case where the base 67 was entirely made of copper and no first heat dissipation section 51 made of graphite was therefore present.

Figure 10:
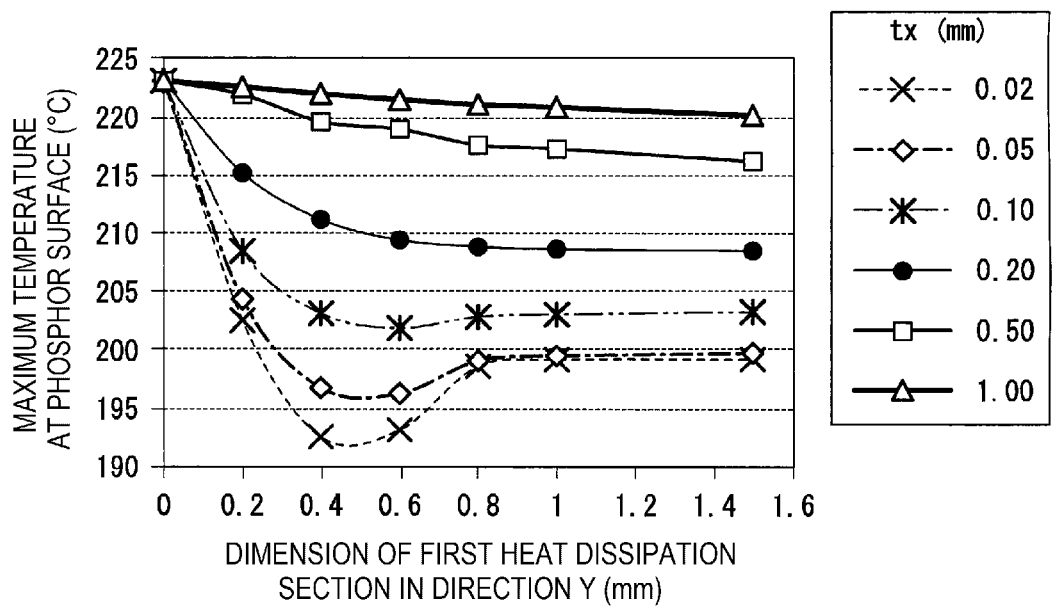
FIG. 10 shows graphs illustrating the relationship between the dimension of a first heat dissipation section and the temperature at a phosphor surface.

FIG. 10 shows graphs illustrating the relationship between the dimension of the first heat dissipation section 51 in the direction Y and the temperature at the first surface 42a of the wavelength conversion layer 42 in the wavelength converter 65 according to the first variation. The horizontal axis of FIG. 10 represents the dimension (mm) of the first heat dissipation section 51 in the direction Y, and the vertical axis of FIG. 10 represents a maximum temperature (° C.) at the first surface 42a of the wavelength conversion layer 42. A maximum temperature at the first surface 42a of the wavelength conversion layer 42 was employed as the temperature in FIG. 10 because the temperature at the first surface 42a has a predetermined distribution.

When W1 representing the dimension of the first heat dissipation section 51 in the direction Y is 0 mm, that is, when no first heat dissipation section 51 made of graphite is present and the base 67 is entirely made of copper, the maximum temperature at the first surface 42a of the wavelength conversion layer 42 was about 223° C., as shown in FIG. 10. When W1 is greater than 0 mm, that is, when the first heat dissipation section 51 made of graphite is present, the maximum temperature at the first surface 42a of the wavelength conversion layer 42 tends to decrease from the maximum temperature when W1 is 0 mm in all the protection layer thickness conditions. FIG. 10 therefore shows that all the aforementioned configurations in the embodiment provide the effect of lowering the temperature of the wavelength conversion layer 42.

Now particularly consider the protection layer 66 in the present variation. Let tx be the thickness of the protection layer 66, and a configuration in which 0.02 mm≤tx≤0.1 mm allows a decrease in the maximum temperature over the range of 0.3 mm≤W1≤0.8 mm, as compared with a configuration in which 0.8 mm<W1. The result described above indicates that when the size W3 of the light incident area 42r in the direction Y is 0.8 mm, the dimension W1 of the first heat dissipation section 51 in the direction Y desirably satisfies Expression (1) below, and the thickness tx of the protection layer 66 desirably satisfies Expression (2) below.

$$W3 \times 3/8 \leq W1 \leq W3 \quad (1)$$

$$0.02 \text{ mm} \leq tx \leq 0.1 \text{ mm} \quad (2)$$

Also in the first variation, high heat dissipation performance is achieved and an increase in the temperature of the wavelength conversion layer 42 is therefore suppressed, whereby the same effects as those provided in the first embodiment, such as high light emission efficiency of the wavelength converter 65, can be provided. That is, the wavelength converter 65 according to the present variation can provide high heat dissipation performance and high wavelength conversion efficiency.

Although graphite is characterized in that the layers thereof tend to separate from each other, as described above, the wavelength converter 65 according to the first variation, in which the protection layer 66 is provided on the first end surface 51t of the first heat dissipation section 51, which prevents the layers of graphite from separating from each other, allows an increase in mechanical strength of the base 67. Further, using a metal that intimately adheres to the bonding material to cover the uppermost layer of the protection layer 66, which is the layer facing the wavelength conversion layer 42, allows an increase in the bonding strength at which the wavelength conversion layer 42 is bonded to the base 67 and the first heat dissipation section 51. Further, the bonding strength at which the reflection layer 43 is bonded to the base 67 and the first heat dissipation section 51 can be increased.

Second Variation

A second variation will be described below with reference to FIGS. 11 and FIGS. 12A to 12C.

Figure 11:
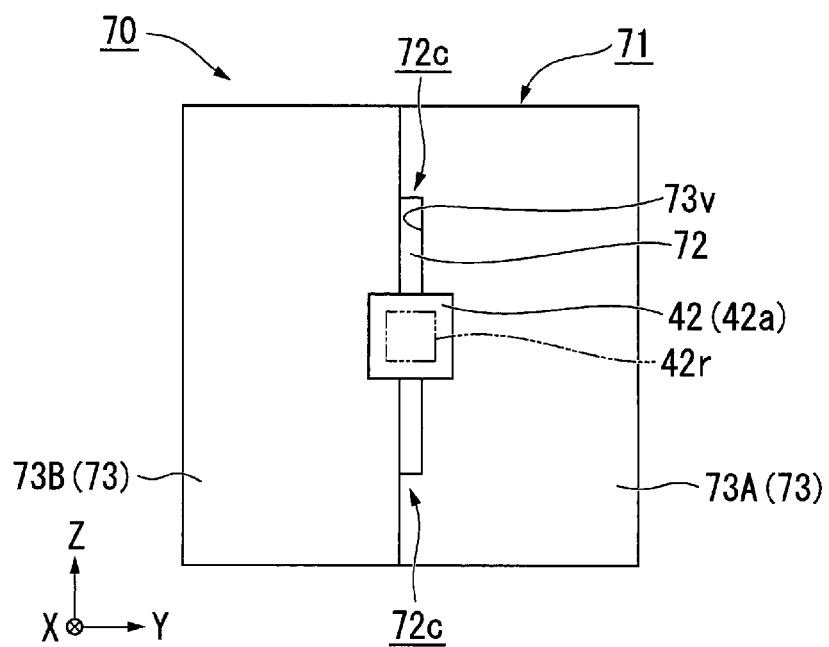
FIG. 11 is a plan view of a wavelength converter according to a second variation.

FIG. 11 is a plan view of a wavelength converter 70 according to the second variation.

In FIG. 11, components common to those in the figures used in the description of the first embodiment have the same reference characters and will not be described.

The wavelength converter 70 according to the second variation includes the wavelength conversion layer 42 and a base 71, as shown in FIG. 11. The base 71 includes the first heat dissipation section 72 and the second heat dissipation section 73. The second heat dissipation section 73 includes a first heat dissipator 73A and a second heat dissipator 73B. The first heat dissipation section 72 is sandwiched between the first heat dissipator 73A and the second heat dissipator 73B along the direction Y.

Further, in the second variation, end sections 72c of the first heat dissipation section 72 in the direction Z are covered with the second heat dissipation section 73. More specifically, a recess 73v having a depth corresponding to the thickness of the first heat dissipation section 72 is provided in a surface of the first heat dissipator 73A that is the surface facing the second heat dissipator 73B, the two heat dissipators forming the second heat dissipation section 73, and the first heat dissipation section 72 is accommodated in the recess 73v. In the configuration, the end sections 72c of the first heat dissipation section 72 in the direction Z are covered with the inner wall surface of the recess 73v of the first heat dissipator 73A. The recess 73v described above may instead be provided in the second heat dissipator 73B or both in the first heat dissipator 73A and the second heat dissipator 73B.

The wavelength converter 70 according to the present variation is produced, for example, by carrying out the steps shown in FIGS. 12A to 12C below.

Figure 12A:
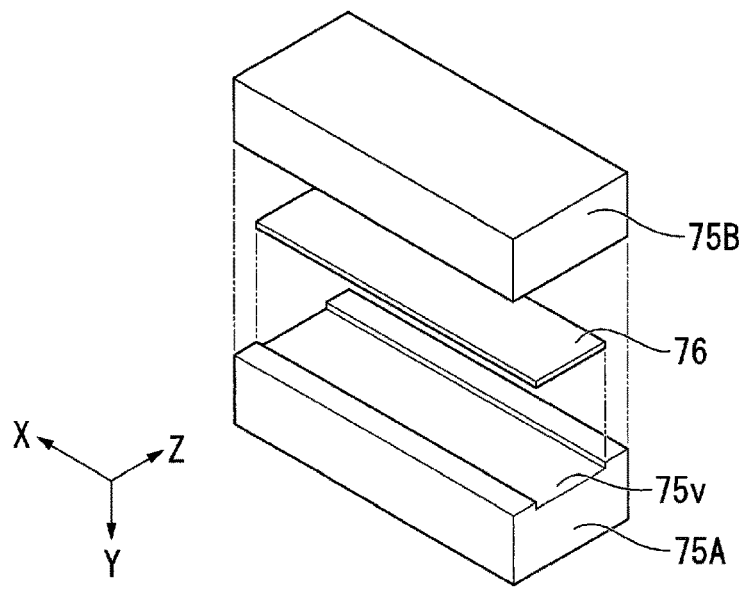
FIG. 12A is a perspective view showing a step in the process of manufacturing the wavelength converter according to the second variation.

Two copper blocks 75A and 75B and one graphite plate 76 are first prepared, as shown in FIG. 12A. In this process, a recess 75v having a width and a depth capable of accommodating the graphite plate 76 is formed in the block 75A, which is one of the two blocks.

Figure 12B:
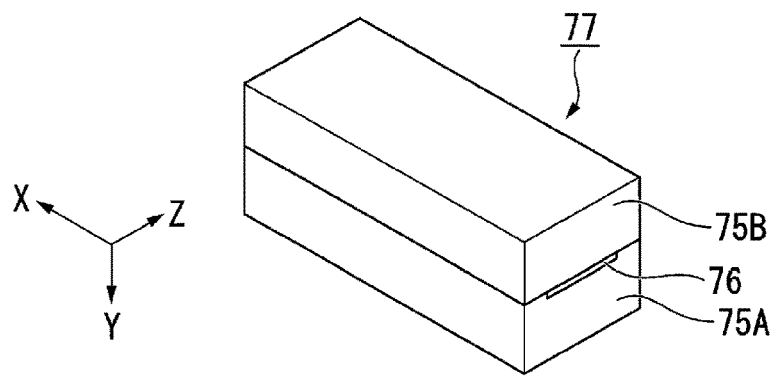
FIG. 12B is a perspective view showing the step following FIG. 12A.

After the graphite plate 76 is accommodated in the recess 75v in the block 75A, which is one of the two blocks, the graphite plate 76 is then sandwiched between the two blocks 75A and 75B, as shown in FIG. 12B. In this state, the blocks 75A and 75B are bonded to the graphite 76 in a diffusive bonding process with pressure and temperature applied to form a laminate 77 formed of the two blocks 75A and 75B and the graphite plate 76 integrated with each other. In this process, a metal may be plated on surfaces of the graphite plate 76 that are the surfaces being in contact with the blocks 75A and 75B to increase the bonding force at the interface between the graphite plate 76 and the blocks 75A, 75.

Figure 12C:
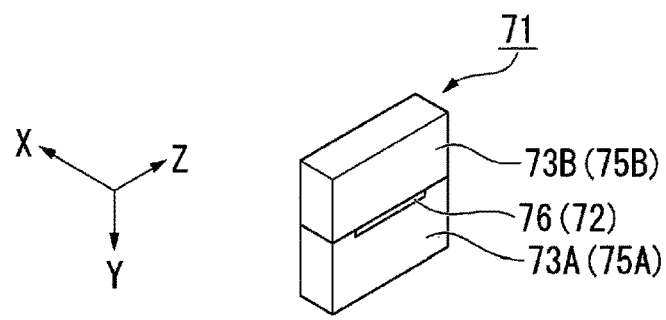
FIG. 12C is a perspective view showing the step following FIG. 12B.

The laminate 77 is then cut into the base 71 having a desired thickness, as shown in FIG. 12C. To produce the wavelength converter 70 according to the second variation, the protection layer 66 may then be formed on a surface of the cut base 71 that is the surface to which the wavelength conversion layer 42 is bonded. That is, the protection layer 66 may be formed on a surface of the first heat dissipation section 72 that is the surface facing the wavelength conversion layer 42. Instead, the protection layer 66 may be formed on surfaces of the first heat dissipator 73A and second heat dissipator 73B that are the surfaces facing the wavelength conversion layer 42. The form shown in FIG. 8, with reference to which the first variation has been described, may be employed as the configuration of the protection layer 66. Instead, the form shown in FIG. 9, with reference to which the first variation has been described, may be employed as the configuration of the protection layer 66.

The wavelength conversion layer 42 is then bonded to the one surface of the base 71 via a bonding material.

The wavelength converter 70 according to the present variation is completed by carrying out the steps described above.

Also in the second variation, high heat dissipation performance is achieved and an increase in the temperature of the wavelength conversion layer 42 is therefore suppressed, whereby the same effects as those provided in the first embodiment, such as high light emission efficiency of the wavelength converter 70, can be provided.

Although graphite is characterized in that the layers thereof tend to separate from each other, as described above, the wavelength converter 70 according to the second variation, in which the second heat dissipation section covers 73 the end sections 72c of the first heat dissipation section 72 in the direction Z and therefore prevents the layers of graphite from separating from each other, allows an increase in mechanical strength of the base 71.

In the area other than the area where the recess 73v is provided out of a surface of the first heat dissipator 73A that is the surface facing the second heat dissipator 73B, the first heat dissipator 73A and the second heat dissipator 73B are directly bonded to each other with no first heat dissipation section 72 interposed therebetween. The bonding strength between the first heat dissipator 73A and the second heat dissipator 73B can therefore be increased, whereby the mechanical strength of the base 71 can be increased.

The wavelength converter 70 according to the second variation allows a plurality of bases 71 to be produced together by cutting the laminate 77 shown in FIG. 12C. The wavelength converter 70 can therefore be manufactured at low cost with high productivity.

Third Variation

A third variation will be described below with reference to FIG. 13.

Figure 13:
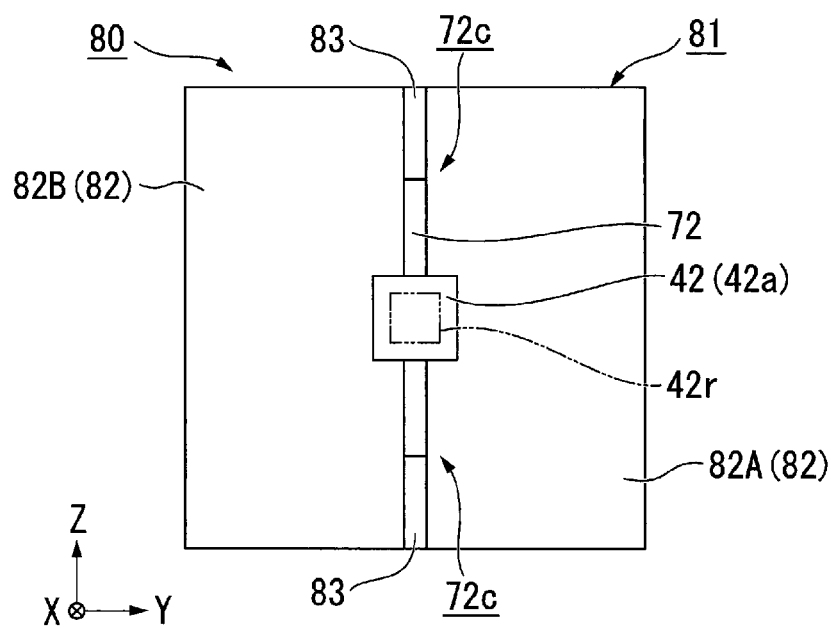
FIG. 13 is a plan view of a wavelength converter according to a third variation.

FIG. 13 is a plan view of a wavelength converter 80 according to the third variation.

In FIG. 13, components common to those in the figures used in the description of the first embodiment have the same reference characters and will not be described.

The wavelength converter 80 according to the third variation includes the wavelength conversion layer 42 and a base 81, as shown in FIG. 13. The base 81 includes the first heat dissipation section 72, a second heat dissipation section 82, and protection members 83. The second heat dissipation section 82 includes a first heat dissipator 82A and a second heat dissipator 82B. The first heat dissipation section 72 is sandwiched between the first heat dissipator 82A and the second heat dissipator 82B along the direction Y.

Further, in the third variation, the end sections 72c of the first heat dissipation section 72 in the direction Z are covered with the protection members 83 sandwiched between the first heat dissipator 82A and the second heat dissipator 82B. It is desirable that the protection members 83 protect the graphite end portions that form the first heat dissipation section 72, as described in the first and second variations, and that the coefficient of linear expansion of the protection members 83 is close to the coefficient of linear expansion of the phosphor that forms the wavelength conversion layer 42.

Consider the case where the material of the wavelength conversion layer 42 is Ce:YAG, and the coefficient of linear expansion of Ce:YAG is about $8.0 \times 10^{-6}/°$ C. Any of the following materials can therefore be used as the material of the protection members 83: Kovar having a coefficient of linear expansion of $5.4 \times 10^{-6}/°$ C.; a copper/molybdenum alloy having a coefficient of linear expansion ranging from $7.5 \times 10^{-6}/°$ C. to $9.8 \times 10^{-6}/°$ C.; a copper/tungsten alloy having a coefficient of linear expansion ranging from $6.4 \times 10^{-6}/°$ C. to $9.8 \times 10^{-6}/°$ C.; and alumina having a coefficient of linear expansion of $7.2 \times 10^{-6}/°$ C. The coefficient of linear expansion of copper of which the second heat dissipation section 82 is made is about $17 \times 10^{-6}/°$ C.

Also in the third variation, high heat dissipation performance is achieved and an increase in the temperature of the wavelength conversion layer 42 is therefore suppressed, whereby the same effects as those provided in the first embodiment, such as high light emission efficiency of the wavelength converter 80, can be provided.

In the third variation, since part of the base 81 is formed of the protection members 83 having a coefficient of linear expansion close to the coefficient of linear expansion of the wavelength conversion layer 42, the difference in coefficient of linear expansion between the base 81 and the wavelength conversion layer 42 is smaller than in a case where no protection member 83 is provided. Stress induced at the interface between the base 81 and the wavelength conversion layer 42 when the temperature of the wavelength conversion layer 42 increases can thus be reduced. As a result, the situation in which the wavelength conversion layer 42 bonded to the base 81 is separated therefrom due to the stress, whereby the reliability of the wavelength converter 80 can be increased.

The first and second variations described above or the first and third variations described above may be combined with each other and applied to each of the embodiments described above. That is, the wavelength converter may be so configured that all end surfaces of the first heat dissipation section are not exposed to the space outside the base.

The technical range of the disclosure is not limited to the embodiments described above, and a variety of changes can be made thereto to the extent that the changes do not depart from the substance of the present disclosure.

For example, the aforementioned embodiments have been described with reference to the case where the second heat dissipation section is formed of the first and second heat dissipators separate from each other, and the first and second heat dissipators may instead be integrated with each other into a second heat dissipation section formed of a single member.

The aforementioned embodiments have been described with reference to the case where the first heat dissipation section is made of a material containing graphite. In addition, the first heat dissipation section can, for example, be made of a material in which arbitrary high thermal conductivity fillers are oriented in a specific direction.

The aforementioned embodiments have been described with reference to the case where a fixed wavelength converter configured not to be rotatable is used. The present disclosure is also applicable to a wavelength converter configured to be rotatable with a motor.

In addition to the above, the specific descriptions of the shape, the number, the arrangement, the material, and other factors of the components of the wavelength converter, the light source apparatus, and the projector are not limited to those in the embodiments described above and can be changed as appropriate. The aforementioned embodiments have been described with reference to the case where the light source apparatus according to the present disclosure is incorporated in a projector using liquid crystal light valves, but not necessarily. The light source apparatus according to the present disclosure may be incorporated in a projector using a digital micromirror device as each of the light modulators.

The aforementioned embodiments have been described with reference to the case where the light source apparatus according to the present disclosure is incorporated in a projector, but not necessarily. The light source apparatus according to the present disclosure may be used as a lighting apparatus, a headlight of an automobile, and other components.

What is claimed is:

1. A wavelength converter comprising:
a wavelength conversion layer having a first surface on which excitation light that belongs to a first wavelength band is incident and a second surface different from the first surface and converts the excitation light into fluorescence that belongs to a second wavelength band different from the first wavelength band; and
a base so provided as to face the second surface,
wherein the base includes a first heat dissipation section so provided as to face in the same direction as a light incident area of the first surface that is an area on which the excitation light is incident and a second heat dissipation section thermal conductivity of which in a first direction that intersects the first surface is lower than thermal conductivity of the first heat dissipation section.

2. The wavelength converter according to claim 1,
wherein the first heat dissipation section is so provided as to be in contact with the second heat dissipation section in a second direction that intersects the first direction, and
the thermal conductivity of the first heat dissipation section in the second direction is lower than the thermal conductivity of the second heat dissipation section in the second direction.

3. The wavelength converter according to claim 2,
wherein a dimension of the first heat dissipation section in the second direction is smaller than a dimension of the wavelength conversion layer in the second direction when viewed along the first direction, and
the dimension of the first heat dissipation section in the second direction is smaller than a size of the light incident area in the second direction when viewed along the first direction.

4. The wavelength converter according to claim 2,
wherein a dimension of the first heat dissipation section in the second direction is smaller than a dimension of the wavelength conversion layer in the second direction when viewed along the first direction, and
the dimension of the first heat dissipation section in the second direction is greater than a size of the light incident area in the second direction when viewed along the first direction.

5. The wavelength converter according to claim 2,
wherein a dimension of the first heat dissipation section in the second direction is greater than a dimension of the wavelength conversion layer in the second direction when viewed along the first direction, and
the dimension of the first heat dissipation section in the second direction is greater than a size of the light incident area in the second direction when viewed along the first direction.

6. The wavelength converter according to claim 2,
wherein the second heat dissipation section includes a first heat dissipator and a second heat dissipator,
the first heat dissipator and the second heat dissipator are provided along the second direction, and
the first heat dissipation section is provided between the first heat dissipator and the second heat dissipator.

7. The wavelength converter according to claim 2,
wherein the thermal conductivity of the first heat dissipation section in a third direction that intersects the first and second directions is higher than the thermal conductivity of the second heat dissipation section in the third direction.

8. The wavelength converter according to claim 7,
wherein an end portion of the first heat dissipation section in the third direction is covered with the second heat dissipation section.

9. The wavelength converter according to claim 6,
wherein an end portion of the first heat dissipation section in a third direction that intersects the first and second directions is covered with a protection member provided between the first heat dissipator and the second heat dissipator.

10. The wavelength converter according to claim 9,
wherein the thermal conductivity of the first heat dissipation section in the third direction is higher than the thermal conductivity of the second heat dissipation section in the third direction.

11. The wavelength converter according to claim 1, further comprising a metal film provided between the second surface and the first heat dissipation section.

12. The wavelength converter according to claim 1, wherein the first heat dissipation section contains graphite.

13. The wavelength converter according to claim 12, wherein the first heat dissipation section contains metal.

14. The wavelength converter according to claim 1, wherein the second heat dissipation section contains metal.

15. A light source apparatus comprising:
the wavelength converter according to claim 1; and
a light source that outputs the excitation light to the wavelength converter along the first direction.

16. A projector comprising:
the light source apparatus according to claim 15;
a light modulator that modulates the light from the light source apparatus in accordance with image information; and
a projection optical apparatus that projects the light modulated by the light modulator.

17. The wavelength converter according to claim 1, further comprising
a protection layer disposed between the wavelength conversion layer and the base,
wherein the base includes a third surface facing to the second surface,
the second heat dissipation section includes a first heat dissipator and a second heat dissipator which sandwich the first heat dissipation section along a second direction intersecting with the first direction,
the first heat dissipation section overlaps an incident area of the excitation light on the wavelength conversion layer and extends to an outside of outer circumference of the wavelength conversion layer, when the wavelength converter is seen in a direction perpendicular to the first surface, and the protection layer is formed on the third surface and disposed over the first heat dissipation section, the first heat dissipator and the second heat dissipator.

\* \* \* \* \*